United States Patent
Tanaka et al.

(10) Patent No.: US 8,314,607 B2
(45) Date of Patent: Nov. 20, 2012

(54) ROTATION ANGLE DETECTOR

(75) Inventors: Kengo Tanaka, Tokyo (JP); Fumihiko Abe, Tokyo (JP); Dongzhi Jin, Tokyo (JP)

(73) Assignee: The Furukawa Electric Co., Ltd, Tokyo (JP)

( * ) Notice: Subject to any disclaimer, the term of this patent is extended or adjusted under 35 U.S.C. 154(b) by 352 days.

(21) Appl. No.: 12/519,515

(22) PCT Filed: Dec. 14, 2007

(86) PCT No.: PCT/JP2007/074116
§ 371 (c)(1),
(2), (4) Date: Jun. 16, 2009

(87) PCT Pub. No.: WO2008/075623
PCT Pub. Date: Jun. 26, 2008

(65) Prior Publication Data
US 2010/0045271 A1      Feb. 25, 2010

(30) Foreign Application Priority Data

Dec. 18, 2006   (JP) ................................. 2006-339460

(51) Int. Cl.
*G01B 7/30* (2006.01)
(52) U.S. Cl. .............................. 324/207.13; 324/207.25
(58) Field of Classification Search ............ 324/207.11–207.25, 762.01–762.1, 754.01–754.3, 117 R, 324/117 H
See application file for complete search history.

(56) References Cited

U.S. PATENT DOCUMENTS 3,778,692 A * 12/1973 Angersbach et al. ......... 388/838
5,514,952 A *  5/1996 Parkinson ................ 324/207.25
(Continued)

FOREIGN PATENT DOCUMENTS

JP            7-4986 A       1/1995
(Continued)

OTHER PUBLICATIONS

International Search Report dated Dec. 9, 2008 for PCT Application Serial No. PCT/JP2007/074116, 2 pages.

(Continued)

*Primary Examiner* — Tung X Nguyen
(74) *Attorney, Agent, or Firm* — Turocy & Watson, LLP (57) ABSTRACT

To provide a rotation angle detector, which is characterized in that the rotation angle detector is for detecting a rotation angle of a measurable rotation body, by which it becomes able to measure the rotation angle of the measurable rotation body with an accuracy as higher even in a case where there may be happened such as an axial backlash or the like on an axis of rotation in the measurable rotation body, and then such a rotation angle detector 1 comprises: a magnetic detecting element 40, for detecting a magnetic flux density of a magnet 10 that is designed to be attached onto the measurable rotation body and then to be rotated as integral with the measurable rotation body, wherein the magnetic detecting element 40 is arranged at a position as approximately intermediate in a path from a north pole to a south pole according to a line of magnetic force due to the magnet 10, and then thereby it becomes able to measure the rotation angle of the measurable rotation body with the accuracy as higher even in the case where there may be happened such as the axial backlash or the like on the axis of rotation in the measurable rotation body.

3 Claims, 12 Drawing Sheets

U.S. PATENT DOCUMENTS

| | | | |
|---|---|---|---|
| 6,518,749 B1 * | 2/2003 | Oudet et al. | 324/207.2 |
| 2002/0089324 A1 * | 7/2002 | Miyata et al. | 324/207.2 |
| 2007/0268015 A1 * | 11/2007 | Hatanaka et al. | 324/207.25 |

FOREIGN PATENT DOCUMENTS

| | | |
|---|---|---|
| JP | 7-243867 A | 9/1995 |
| JP | 2003-75108 A | 12/1995 |
| JP | 2002-340513 A2 | 11/2002 |
| JP | 2006105827 | 4/2006 |

OTHER PUBLICATIONS

Microfilm of the specification and drawings annexed to the request of Japanese Utility Model Application No. 121703/1990 (Laid-open No. 78561/1992) (Tokai Rika Co. / Ltd. ) / Jul. 8, 1992 / Full text; all drawings (Family: none).

* cited by examiner

ROTATION ANGLE DETECTOR

CROSS-REFERENCE TO RELATED APPLICATIONS

This application is a US national stage filing of patent cooperation treaty (PCT) Appln. No. PCT/JP2007/074116 (WO 2008/075623), filed Dec. 14, 2007 which claims priority to Japanese patent application No. 2006-339460, filed on Dec. 18, 2006, the entire content of which are incorporated herein by reference.

TECHNICAL FIELD

The present invention relates to a rotation angle detector to be attached to a rotation body and then to be made use for detecting a rotation angle of such the rotation body.

BACKGROUND ART

So far, there is heretofore known a rotation angle detector for detecting such as a shaft that is being rotated or the like (refer to a patent document 1 for example). Regarding such the rotation angle detector, there is formed a magnet therein to be as a disk shape and then to be supported by an axis of rotation therein. Moreover, there is designed such the magnet to be configured as rotatable in a predetermined direction with such the axis of rotation as a center therefor. Further, such the rotation angle detector further comprises magnetic sensors as two units therefor. Still further, such the magnetic sensors as two units are Hall elements, and then there is designed the same to be arranged for having an angle as approximately ninety degrees for between a straight line, that passes through a center of such the disk and through one of the magnetic sensors, and another straight line, that passes through the center of such the disk and through the other one of the magnetic sensors. Furthermore, there is designed each of such the magnetic sensors to be arranged at directly under a circumference of such the magnet respectively.

[Patent Document 1] Japanese Patent Application Publication No. 2003-075108 (claims 2 to 4, FIG. 4 and FIG. 5)

DISCLOSURE OF THE INVENTION

Problems to be Solved by the Invention

Here, regarding the conventional rotation angle detector as mentioned above, there is designed the magnet to be magnetized in a radial direction thereof, and then there is designed each of the Hall elements to be arranged at edge parts on the circumference of such the magnet for improving a sensitivity of each of the sensors. Moreover, according to such the configuration thereof, it is able to maintain an accuracy of the detection therefor only in a case where a relationship of relative positions between the magnet and each of the Hall elements is not varied at all. However, according to the actual rotation angle detector, there is a backlash in an axial direction of an axis for the rotation or in a radial direction thereof, and then thereby a relative distance between such the magnet and each of such the Hall elements is varied dynamically. Hence, each of such the Hall elements cannot help but detect a signal due to a movement of such the magnet that is not related to the rotation regarding the axis of the rotation thereof at all. Thus, there is a problem that it is not able to perform the detection of the angle with the accuracy as higher.

As more specifically thereto, in a case where such the rotation angle detector is attached onto a steering shaft in a motor vehicle for example, it is required to attach such the rotation angle detector onto the steering shaft therein within a limited short tact time therefor as quickly. And then for improving such an assembly easiness, there is normally performed that such the backlash with a certain degree of magnitude is allowed regarding a direction of an axis line in particular for a rotor at between such the rotor in such the rotation angle detector and a stator therein.

However, in the case where such the backlash thereof is allowed, it cannot help but become occurred a difference of the relative positions thereof in the direction of the axis line for the rotor between the stator in such the rotation angle detector and such the rotor therein. And then due to such the shift of the relationship of the relative positions therebetween in the direction of the axis line for such the rotor, it cannot help but become to be detected as an error that must be rotated due to a variation of the magnetic flux density at such a detecting unit even in a case where such the magnet is not being rotated at all. Hence, it becomes unable to maintain the accuracy of the detection therefor as higher by making use of such the rotation angle detector. Moreover, in a case where such the magnet is shifted in the direction of the axis thereof in particular, the magnetic flux density thereof becomes to be larger in a direction as becoming closer to either one of the Hall elements, on the contrary thereto, the magnetic flux density thereof becomes to be smaller in a direction as becoming distant therefrom. And then thereby even in a case where such the magnet is not being rotated at all, each of such the Hall elements becomes to detect a variation of a signal according to such the movement in the direction of the axis for such the magnet. Hence, it cannot help but become to cause an error of an angle therefor.

Figure 8:
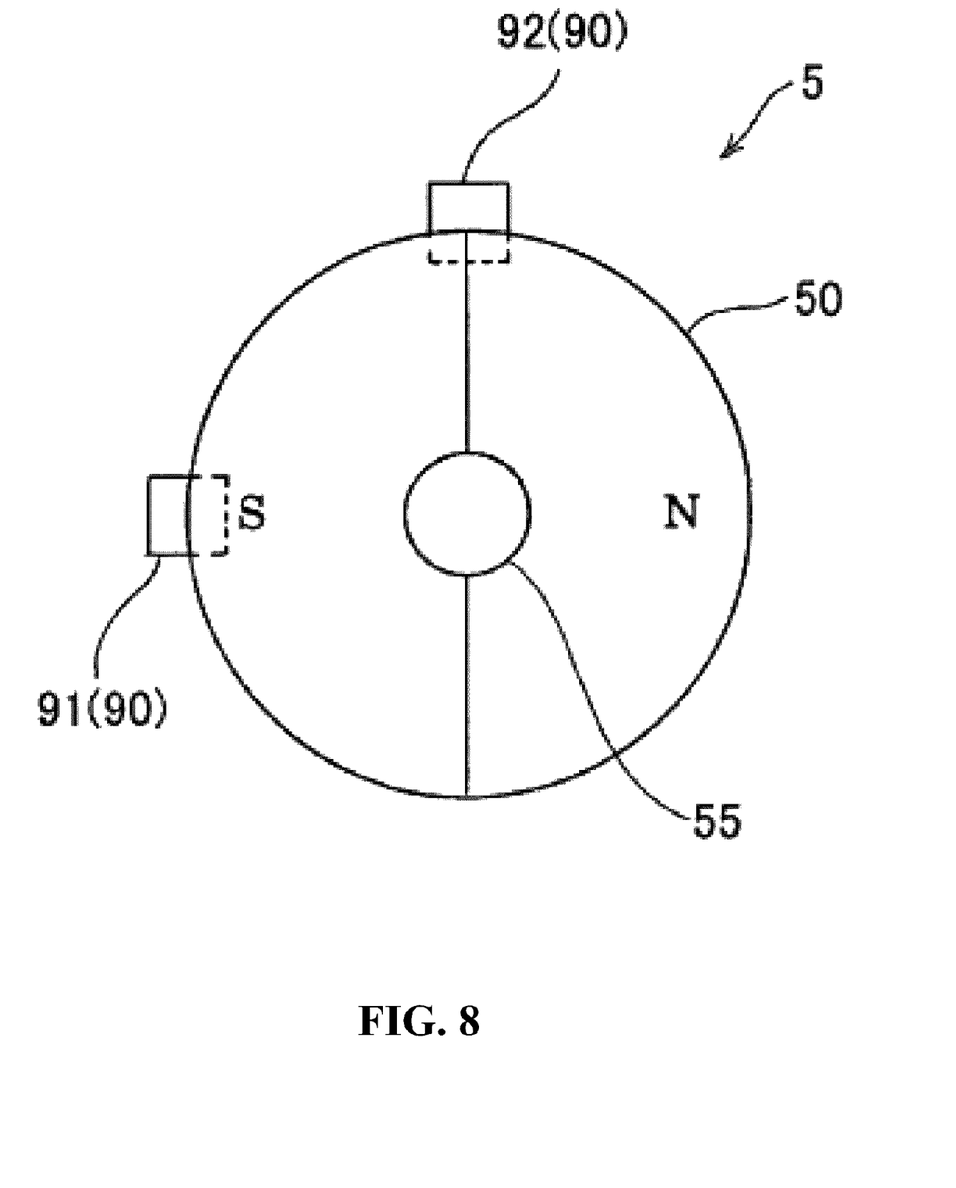
FIG. 8 is a schematic plan view showing a conventional rotation angle detector as corresponding to that as shown in FIG. 1.
Figure 9:
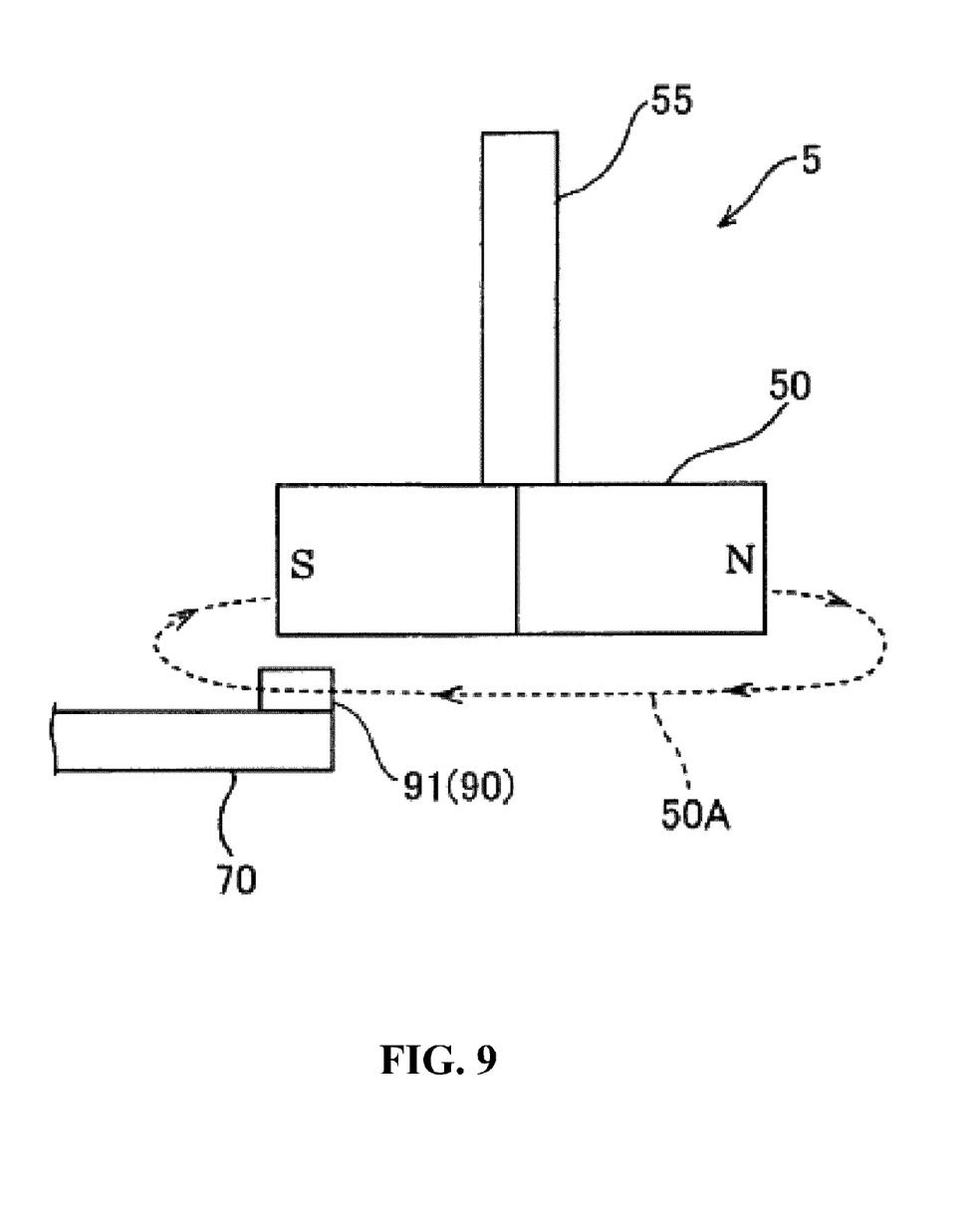
FIG. 9 is a schematic side view showing a conventional rotation angle detector as corresponding to that as shown in FIG. 2, and the same is a view showing the rotation angle detector in which a substrate (stator) is attached onto a magnet (rotor) with having a relationship of relative positions as optimal to each of therebetween.

Next, such the problems will be described in further detail below, with reference to the drawings. Here, FIG. 8 is a schematic plan view for showing such a rotation angle detector 5, wherein each of Hall elements 90 (91 and 92) is designed to be arranged respectively, having an angle therebetween of approximately ninety degrees in a vicinity of a periphery of a magnet 50. Moreover, FIG. 9 is a view for exemplary showing a line of magnetic force 50A according to the magnet 50 at a state that such the rotation angle detector 5 is attached onto a steering shaft that is not shown in the figure with a relationship of dimensions as optimal for therebetween, via a shaft 55. Further, according to such the figure, the Hall elements 90 (the Hall element as the 91 according to FIG. 9) are arranged on a substrate 70 that is designed to be arranged thereat and then to be fixed thereon as independent of the rotation of the magnet 50, for intersecting such the line of magnetic force 50A according thereto in a vicinity of a point part, that has a curvature as the maximum thereat, of such the magnet 50 that is designed to have a disk shape. Furthermore, there is designed to be detected a degree of magnitude for such the magnetic flux density thereof by making use of each of such the Hall elements 90.

Figure 10:
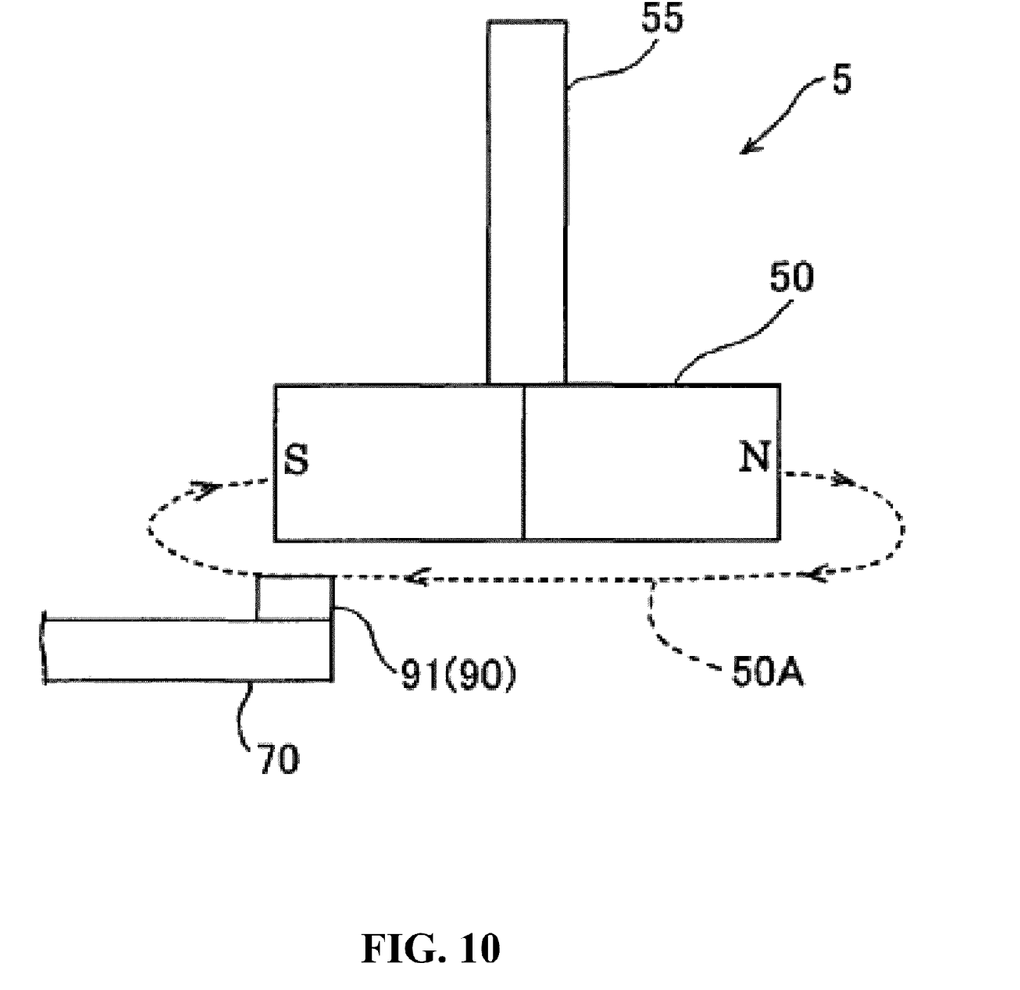
FIG. 10 is a schematic side view showing a state that a substrate (stator), onto which a Hall element is mounted in a rotation angle detector, is shifted comparing to a magnet (rotor) as a little amount toward a direction of a central axis line of the rotation in the rotor.

On the contrary thereto, FIG. 10 shows a state that in a case where a backlash as a certain degree of magnitude thereof is allowed for between a stator therein and a rotor therein regarding a direction of a central axis line of such the rotor in the rotation angle detector 5, that is for improving the assembly easiness for such the rotation angle detector 5 as mentioned above, and then that the magnet 50 in such the rotation angle detector 5 as shown in FIG. 9 is shifted due to such the backlash comparing to each of the Hall elements 90 as a little amount toward the direction of the central axis line of the such the magnet 50. Moreover, such the degree of magnitude to be shifted is the degree of magnitude to be shifted that is required for designing an improvement of the assembly easiness for such the rotation angle detector 5 as described above. And then in a case where such the rotation angle detector 5 becomes to be at such the state thereof, the line of magnetic force 50A according to the magnet 50 cannot help but become to be come apart from each of the Hall elements 90. Thus, it becomes clear that there becomes to be decreased excessively thereby a property of the detection by making use of each of such the Hall elements 90.

On the contrary thereto, there is heretofore known as well the rotation angle detector as disclosed in the Japanese Patent Application Publication No. 2006-105827 for example. Moreover, such the rotation angle detector comprises a magnet as a ring shape, and then has a high freedom regarding a position of an attachment thereof for a steering in a motor vehicle, by penetrating such the magnet through a steering shaft in such the motor vehicle. However, according to such the rotation angle detector, there is designed a Hall element to be arranged in a vicinity of a point part that has a curvature as the maximum regarding a line of magnetic force according to such the magnet, that is for improving a property of a detection regarding such a sensor itself. And then thereby there becomes to be occurred a problem as similar to the case as described above. That is to say, in a case where a backlash as a certain degree of magnitude thereof is allowed in the direction of the central axis line of the rotation of the rotor for between such the rotor in which the magnet is provided and a stator in which the Hall element is provided, that is to say, the direction of the central axis line of the rotation for such the magnet, that is for designing an improvement of an assembly easiness regarding such the rotation angle detector, there becomes such the Hall element not to be crossed through a magnetic circuit of the magnet therein due to a difference of the relative positions for between the stator therein and the rotor therein. And then thereby there becomes to be occurred the problem as similar thereto that there becomes to be decreased the property of the detection by making use of such the Hall element.

Figure 11:
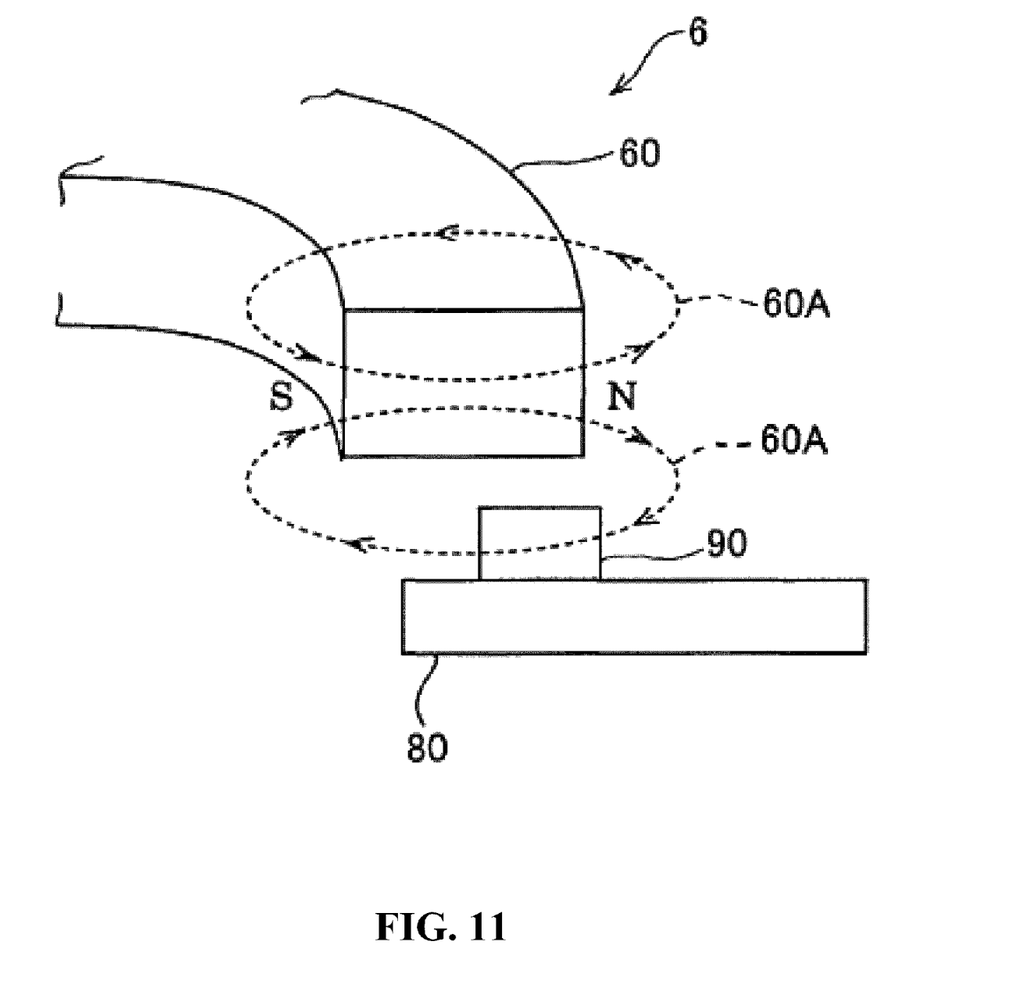
FIG. 11 is a schematic diagrammatic perspective view partially showing another conventional rotation angle detector which is different from that as shown in FIG. 9, and the same is a view showing such the rotation angle detector at a state that a substrate (stator) therein is attached onto a magnet (rotor) therein with having a relationship of relative positions as optimal to each of therebetween.

Further, FIG. 11 is a view for exemplary showing a line of magnetic force 60A according to a magnet 60 in a case where such a rotation angle detector 6 is attached onto a shaft that is not shown in the figure, with a relationship of dimensions as optimal for therebetween. Furthermore, according to the same figure, there is designed to be arranged a Hall element 90 in a vicinity of a point part of the line of magnetic force 60A according to the magnet 60 as a ring shape, and then there is designed to be detected a degree of magnitude for such the magnetic flux density thereof by making use of such the Hall element 90 on a substrate 80 that is designed to be arranged thereat and then to be fixed thereon as independent of the rotation of such the magnet 60.

Figure 12:
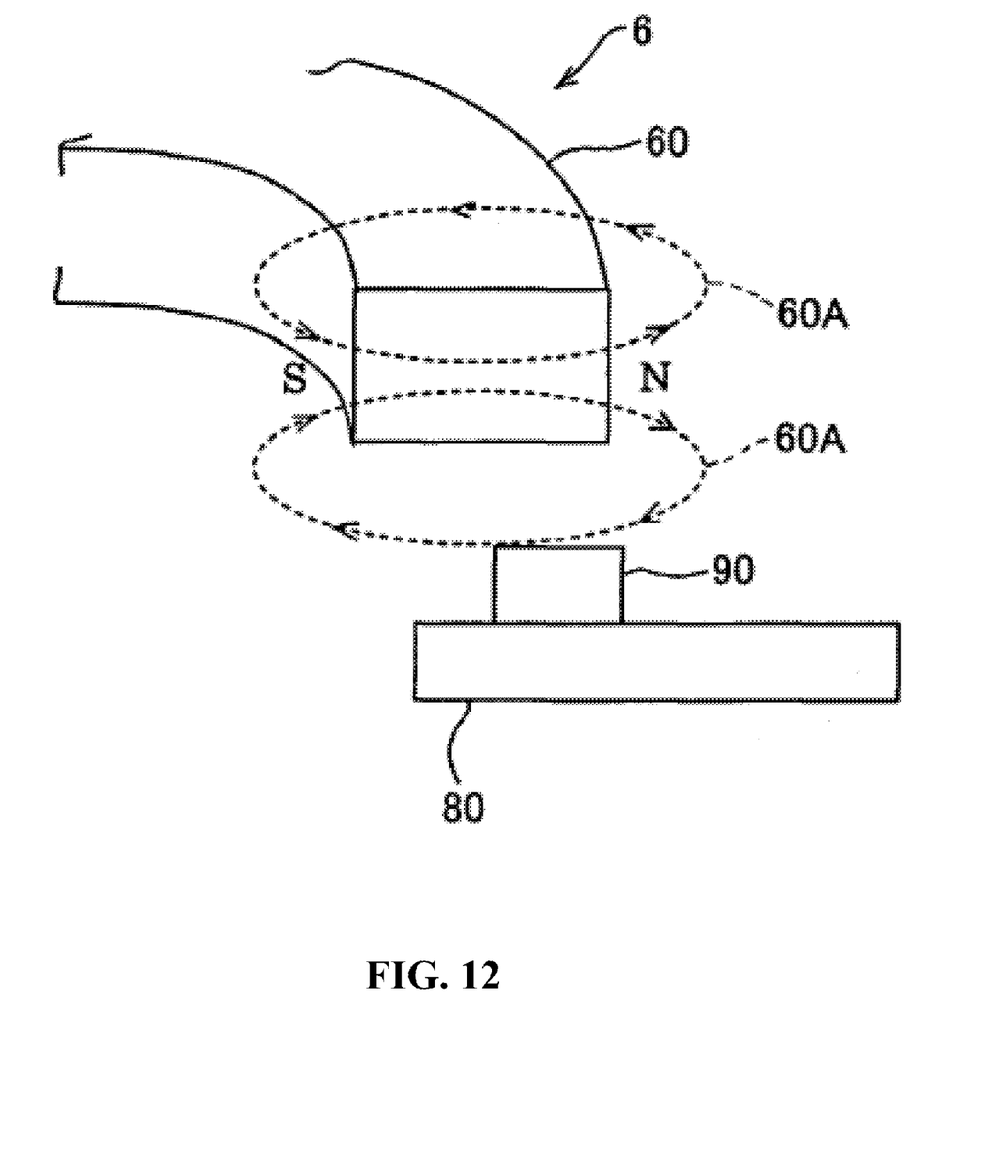
FIG. 12 is a schematic diagrammatic perspective view partially showing a state that a substrate (stator), onto which a Hall element is mounted in another rotation angle detector, which is different from that as shown in FIG. 11, is shifted comparing to a magnet (rotor) as a little amount toward a direction of a central axis line of the rotation in the rotor.

On the contrary thereto, FIG. 12 shows a state that in a case where a backlash as a certain degree of magnitude thereof is allowed for between a stator in the rotation angle detector 6 and a rotor therein regarding a direction of a central axis line of such the rotor, and then that the magnet 60 in such the rotation angle detector 6 as shown in FIG. 11 is shifted due to such the backlash comparing to the Hall element 90 as a little amount toward the direction of the central axis line of the rotation of such the magnet 60. Moreover, such the degree of magnitude to be shifted is the degree of magnitude to be shifted that is required for designing an improvement of an assembly easiness for such the rotation angle detector 6 as described above. And then in a case where such the rotation angle detector 6 becomes to be at such the state thereof, the line of magnetic force 60A of the magnet 60 cannot help but become to be come apart from the Hall element 90. Thus, it becomes clear that there becomes to be decreased excessively the property of the detection by making use of such the Hall element 90.

And then an object of the present invention is to provide a rotation angle detector, by which it becomes able to measure a rotation angle of a measurable rotation body with an accuracy as higher even in a case where there may be happened such as an axial backlash or the like on an axis of rotation in such the measurable rotation body.

Means for Solving the Problem

For solving the subjects as mentioned above, a rotation angle detector according to the present invention is characterized in that the rotation angle detector is for detecting a rotation angle of a measurable rotation body, and the same comprises: a magnetic detecting element, for detecting a magnetic flux density of a magnet that is designed to be attached onto the measurable rotation body and then to be rotated as integral with the measurable rotation body, wherein the magnetic detecting element is designed to be arranged at a position as approximately intermediate in a path from a north pole to a south pole according to a line of magnetic force due to the magnet.

According to the configuration of such the rotation angle detector regarding the present invention, it becomes able to measure the rotation angle of the measurable rotation body with the accuracy as higher at all the times thereof, even in the case where the backlash may be allowed as the certain degree of magnitude thereof in the direction of the central line of the rotation regarding the rotor therein for between such the rotor, that the magnet is provided therein, and the stator, that the magnetic detecting element is provided therein, that is for designing the improvement of the assembly easiness for such the rotation angle detector.

Moreover, the rotation angle detector according to the present invention is characterized in that in addition to such the rotation angle detector as defined in the above aspect, the magnetic detecting element is characterized in that such the magnetic detecting element is for detecting a degree of magnitude regarding the magnetic flux density which is in parallel to the line of magnetic force.

And then by making use of such the magnetic detecting element for such the rotation angle detector according to the present invention, it becomes able to measure the rotation angle of the measurable rotation body with the accuracy as higher.

Furthermore, the rotation angle detector according to the present invention is characterized in that in addition to such the rotation angle detector as defined in the above aspect, the magnet is characterized in that the magnet is magnetized in a direction as parallel to an axis of rotation in the magnet.

And then by making use of such the magnetic detecting element for such the rotation angle detector according to the present invention, it becomes able to measure the rotation angle of the measurable rotation body with the accuracy as further higher.

BEST MODE FOR CARRYING OUT THE INVENTION

A rotation angle detector 1 regarding one embodiment according to the present invention will be described in detail below, with reference to the drawings. Moreover, according to such the description, there will be described in detail below regarding a case where there is designed to be attached such the rotation angle detector onto a steering shaft as a measurable rotation body regarding a steering device in a motor vehicle, and then there is designed to be detected a rotation angle of a steering wheel therein by making use thereof.

Figure 1:
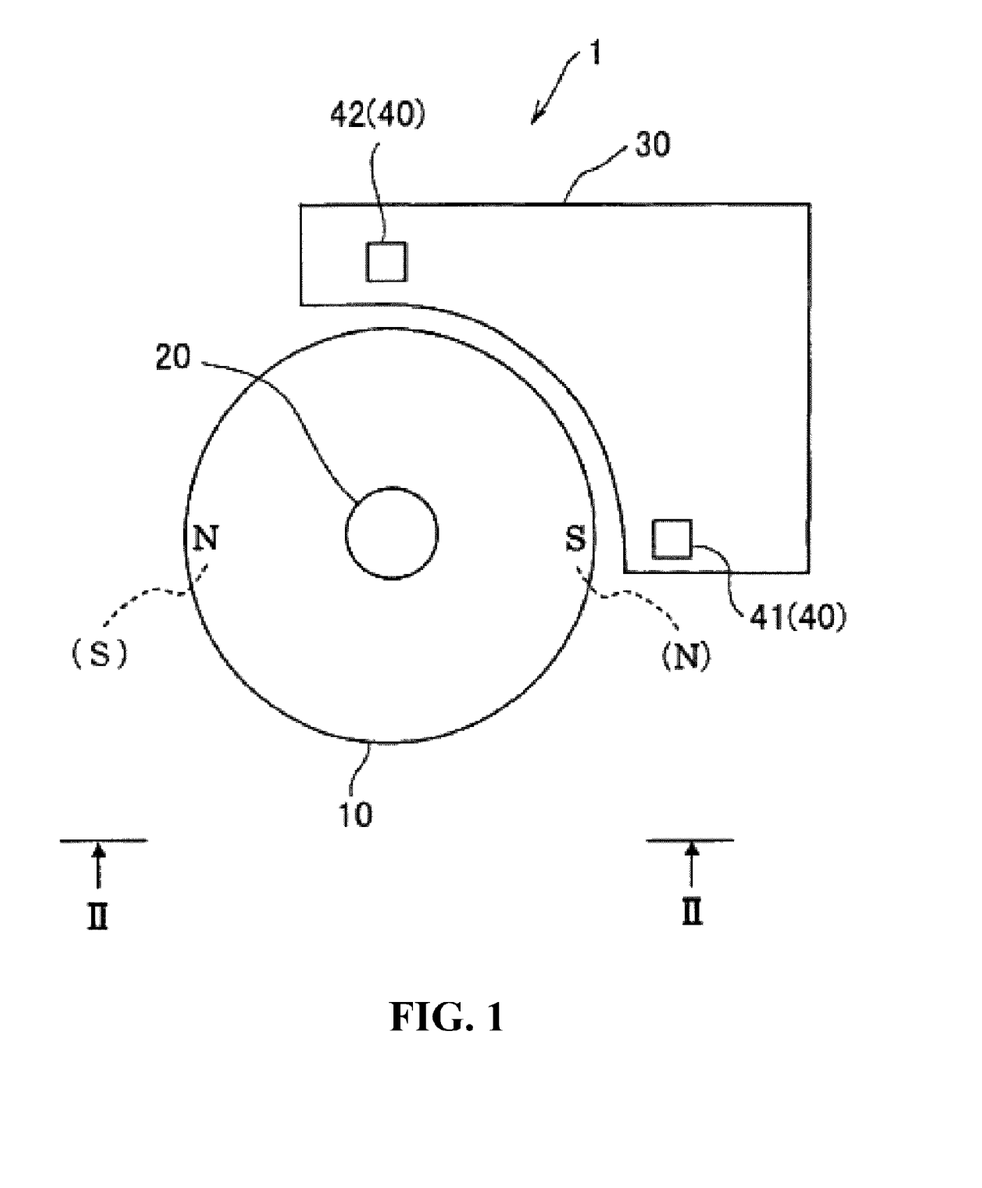
FIG. 1 is a schematic plan view showing a rotation angle detector regarding one embodiment according to the present invention.
Figure 2:
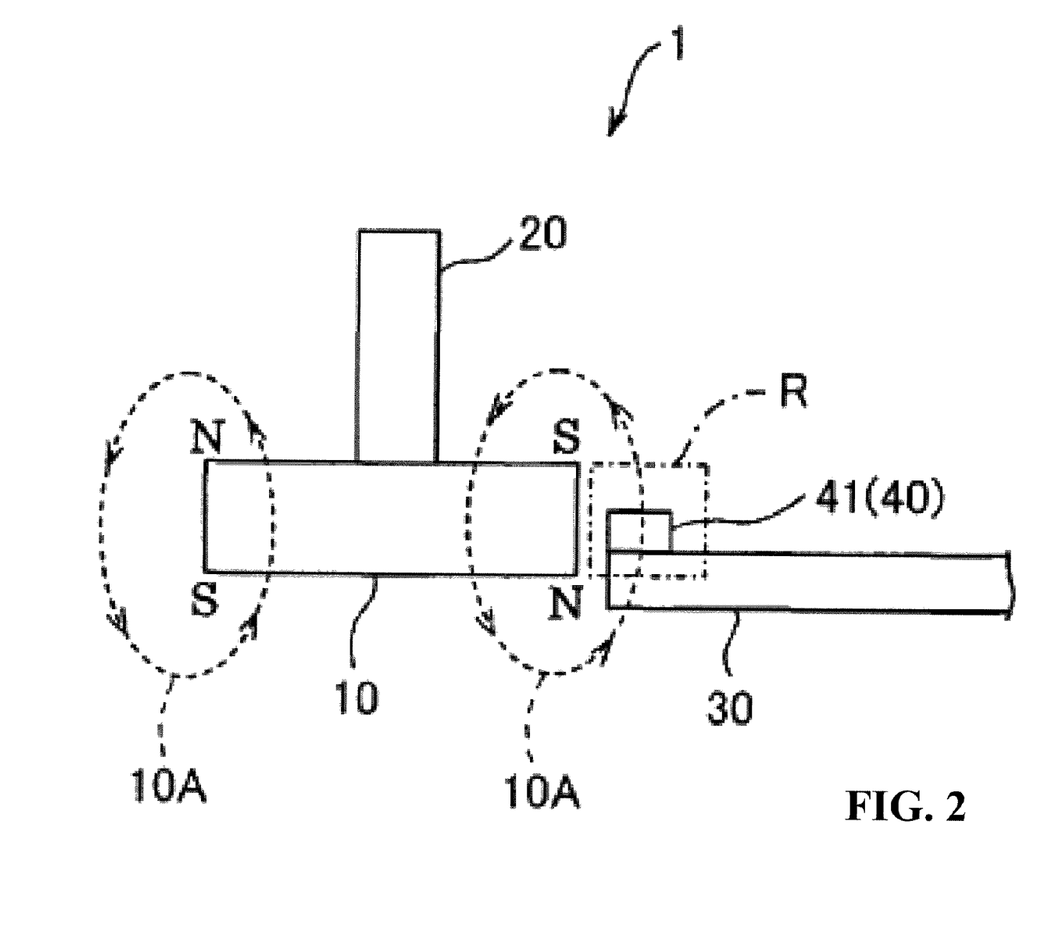
FIG. 2 is a side view from a view point of II-II side schematically showing a state that a substrate (stator) is attached onto a magnet (rotor) with having a relationship of relative positions as optimal to each of therebetween in the rotation angle detector as shown in FIG. 1.

Here, such the rotation angle detector 1 regarding the one embodiment according to the present invention comprises, as shown in FIG. 1 and in FIG. 2: a magnet 10 as a disk shape; a shaft 20 that is designed to be provided as protruding therefrom at one side for a central part of the magnet 10; a substrate 30 that is designed to be fixed as independent of individual rotations of the magnet 10 and of the shaft 20; and Hall elements 40 as two units (41 and 42) (magnetic detecting elements), that are designed to be arranged on such the substrate, with having approximately ninety degrees for therebetween to a central axis line of the magnet 10, and with spacing a distance as equivalent to each other from such the central axis line of the magnet 10, at an outer side in a circumferential direction of such the magnet 10 as the disk shape.

Moreover, there is designed to be fixed such the substrate 30 onto a stator that is comprised of such as a packaging body or the like which is not shown in the figures. Further, there are designed the magnet 10 and the shaft 20 to comprise a portion of a rotor or a whole thereof as not described in detail here. Still further, there is designed such the rotor to be supported as rotatable by such the stator via a member for support that is not shown in the figures. Still further, there is designed a point part of the shaft 20 to be connected to the steering shaft and then to be rotated together as integral therewith, that is for detecting a rotation angle thereof by making use of the rotation angle detector 1. Still further, there is designed to be allowed a backlash as a certain degree of magnitude in a direction of a central axis line of the rotation of the rotor for between the stator in the rotation angle detector 1 and the rotor therein, for improving an assembly easiness of such the rotation angle detector.

Still further, there is designed the magnet 10 to be formed at one point part in a circumferential direction thereof as one side in the direction of the central axis line of the rotation (a right side in FIG. 1 and an upper right side in FIG. 2 for example) is defined to be as a south pole and as the other side in the direction of the axis line thereof (the right side in FIG. 1 and a lower right side in FIG. 2 for example) is defined to be as a north pole. Still further, there is designed the same to be formed at the other point part in the circumferential direction thereof (the point part at the opposite side to the one point part in a direction of a diameter thereof) as one side in the direction of the axis line thereof (a left side in FIG. 1 and an upper left side in FIG. 2 for example) is defined to be as a north pole and as the other side in the direction of the axis line thereof (the left side in FIG. 1 and a lower left side in FIG. 2 for example) is defined to be as a south pole. And then between such the one point part thereof and the other point part thereof, there is designed each of formation regions of the north pole therein and of the south pole therein to be varied gradually toward a direction of a thickness of the magnet 10 (in the direction of the central axis line of the rotation of the magnet 10).

Still further, as not described in detail here, however, there are designed to be housed the substrate 30 and the magnet 10 at an inside of the packaging body to be made from a substance that is for shielding any magnetism from an outer side therefrom. Still further, there is designed for such the packaging body to be able to be attached onto a part for fixing, with making use of such as a bracket or the like as not shown in the figures, that is different from the position for the shaft 20 and from the position for the steering shaft that is designed to be connected thereto as well.

Still further, on such the substrate 30, there is designed to be provided the Hall elements 40 as the two units (41 and 42) as mentioned above, and then to be detected a variation of a magnetic flux density due to the rotation of the shaft 20 to be rotated as integral with the steering shaft as not shown in the figures, that is to say, due to the rotation of the magnet 10, by making use of each of such the Hall elements 40 (41 and 42) respectively.

Still further, regarding a position to be attached each of such the Hall elements 40 (41 and 42) for the magnet 10, there is designed to be arranged at a position within a region that a line of magnetic force 10A due to the magnet 10 is formed and that is approximately intermediate in a path from a north pole to a south pole according to such the line of magnetic force 10A (at an inside of a region as an R that is shown with making use of an alternate long and short dash line in FIG. 2), as it is obvious from a state of an arrangement regarding one of the Hall elements as the 41 as shown in FIG. 2. Still further, there is designed an output from each one of such the Hall elements 40 to be converted into a rotation angle of the magnet 10, that is to say, that of the steering shaft, by making use of an arithmetic and logic unit that is not described in detail here.

Figure 3A:
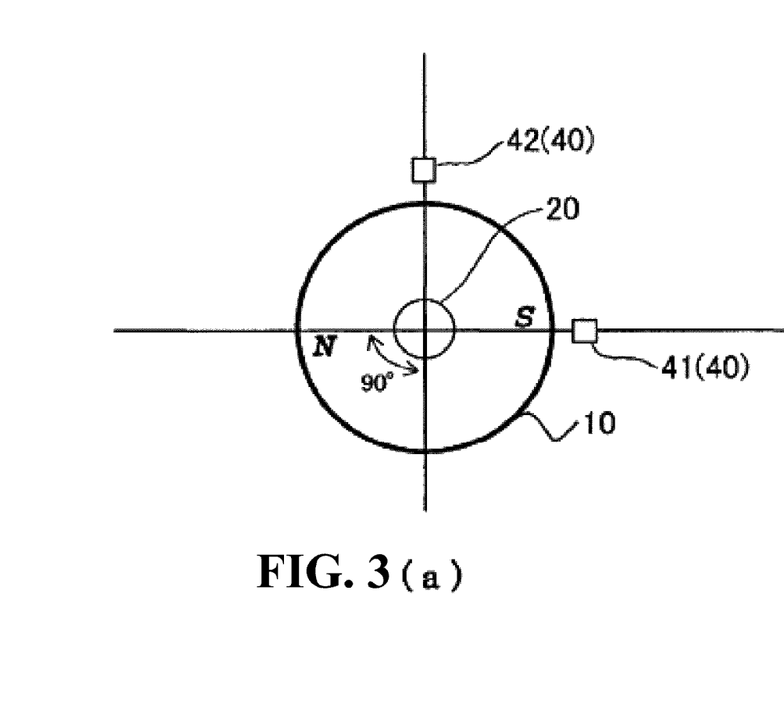
FIG. 3 is a explanatory drawing schematically showing a principle of a detection of a rotation angle by making use of the rotation angle detector as shown in FIG. 1.
Figure 3B:
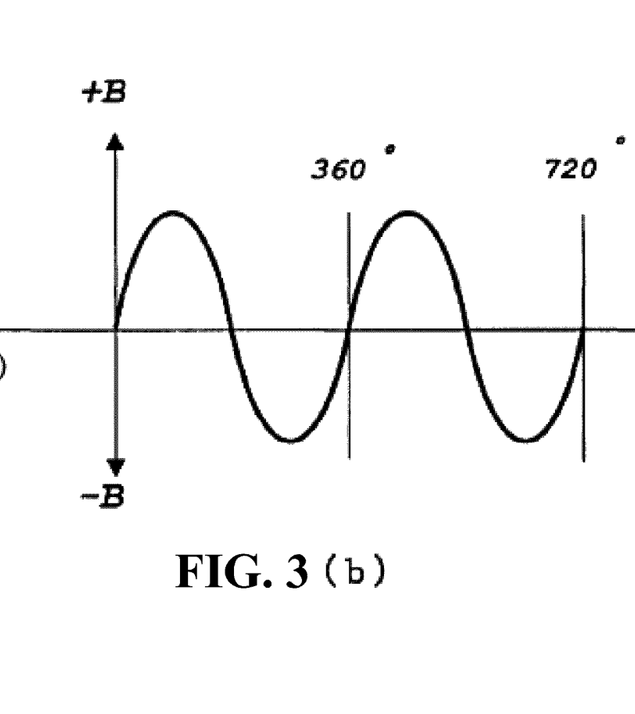

Still further, regarding a principle of the detection for the rotation angle of the magnet 10 (that is to say, that of the steering shaft 20) by making use of each of such the Hall elements 40 and the arithmetic and logic unit as mentioned above, there is designed to be made use of such as the one of the Hall elements as the 41 such as shown in the right side in FIG. 3(a) or the like, that has a characteristic of the output therefrom as shown in FIG. 3(b). Still further, according to such FIG. 3(b), the horizontal axis therein indicates the rotation angle of the magnet 10, that is to say, that of the shaft 20, meanwhile, the vertical axis therein indicates the degree of magnitude of the magnetic flux density according to such the magnet 10. Still further, as there becomes to be cleared from such FIG. 3(b), the characteristic of the output from the one of the Hall elements as the 41 shows a sine wave (a sinusoidal waveform).

Still further, as not shown in the figures here, however, the other one of the Hall elements as the 42, that is designed to be arranged at an upper side of the magnet 10 as shown in FIG. 3(a), has a characteristic of the output therefrom that shows a sinusoidal waveform as shown in FIG. 3(b) that is similar thereto. Still further, there is designed such the characteristic of the output from such the other one of the Hall elements as the 42 to be shifted a phase thereof as approximately ninety degrees from the characteristic of the output from the one of the Hall elements as the 41 as shown in FIG. 3(b), because of an aspect of the arrangements for each thereof on the substrate respectively. Furthermore, as assuming each of the outputs from the individual Hall elements as the 41 and the 42 to be as an X and a Y, that individually have the phases to be shifted as approximately ninety degrees to each other, it becomes able to obtain an output as a saw tooth shape by evaluating $\tan^{-1}$ (X/Y). And then thereby there is designed to be detected the rotation angle of the steering shaft with the accuracy as higher in a cycle as 360 degrees therefor.

Next, a function of such the rotation angle detector 1 as described above will be described in detail below, with reference to the drawings. Here, FIG. 2 is a view for exemplary showing the line of magnetic force 10A according to the magnet 10 in a case where such the rotation angle detector is attached onto a steering shaft in a motor vehicle that is not shown in the figure, with maintaining a state that a relationship of relative positions for between a rotor therein and a stator therein to be as optimal to each of therebetween. And then according to the same figure, there is designed the one of the Hall elements as the 41 to be arranged at a position on the line of magnetic force 10A according to the magnet 10 as the disk shape, that becomes to be parallel to the central axis line of the rotation of such the magnet 10, and that is optimal from a designing point of view. Moreover, there is designed to be detected the degree of magnitude of the magnetic flux density according thereto by making use of such the one of the Hall elements as the 41.

Figure 4:
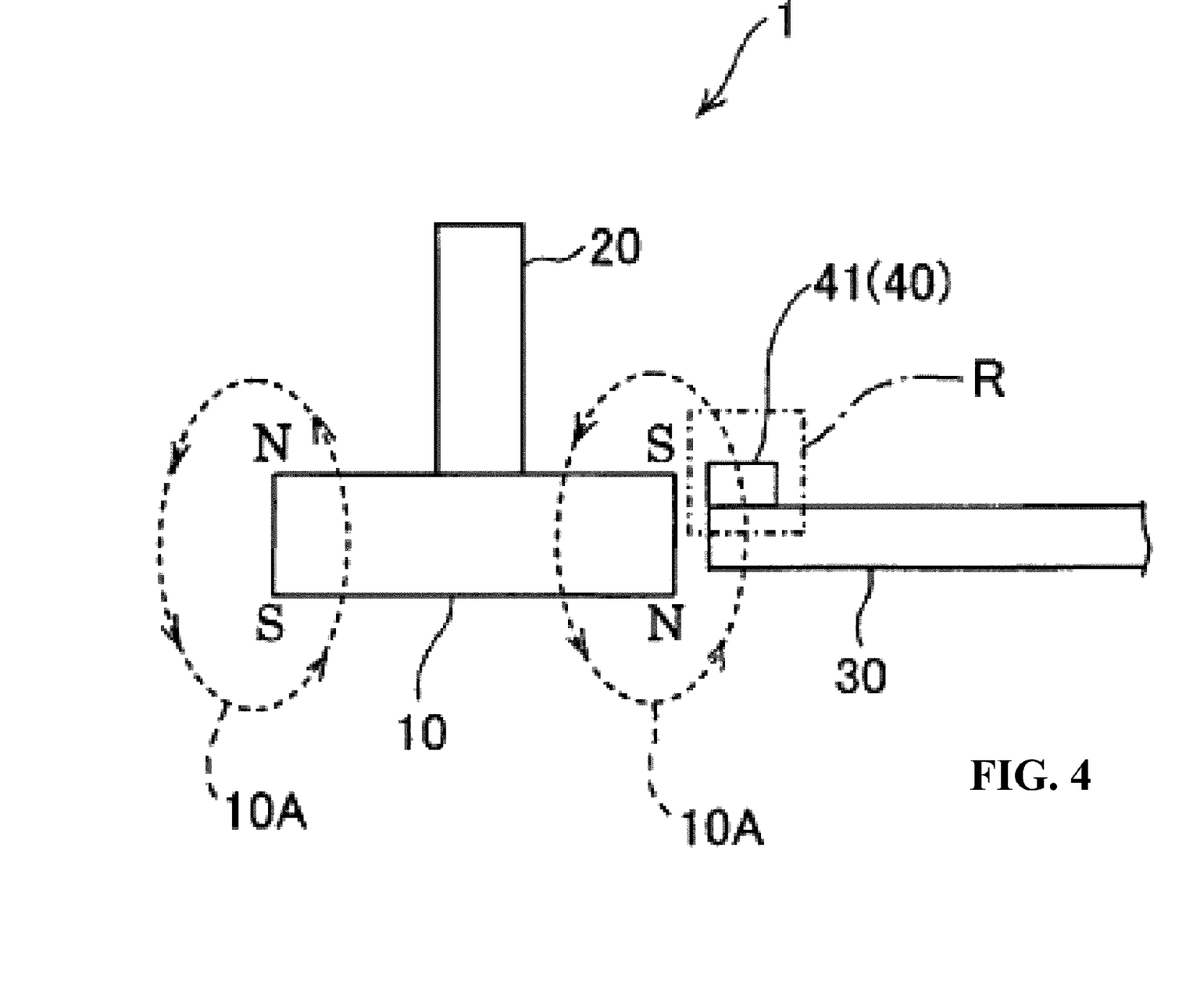
FIG. 4 is a schematic side view showing a state as corresponding to that as shown in FIG. 2 that the substrate (stator), onto which a Hall element is mounted in the rotation angle detector, is shifted comparing to the magnet (rotor) as a little amount toward a direction of a central axis line of the rotation in the rotor.

On the contrary thereto, FIG. 4 shows a state that in a case where a backlash as a certain degree of magnitude thereof is allowed, for improving the assembly easiness for such the rotation angle detector as mentioned above, for between the stator in the rotation angle detector 1 and the rotor therein regarding the direction of the central axis line of the rotation of such the rotor, and then that the magnet 10 in such the rotation angle detector 1 as shown in FIG. 2 is shifted due to such the backlash as a little amount toward the direction of the central axis line of the rotation of the such the magnet 10 comparing to the one of the Hall elements as the 41. Moreover, such the degree of magnitude to be shifted is the degree of magnitude to be shifted that is required for designing an improvement of the assembly easiness for such the rotation angle detector 1. And then even there becomes to be at such the state thereof, regarding the line of magnetic force 10A according to the magnet 10 crossing the one of the Hall elements as the 41 how to cross therethrough, it is approximately equivalent to the case where the relationship of the relative positions for between the magnet 10 and the one of the Hall elements as the 41 as shown in FIG. 2 is at the state as the optimum to each of therebetween. Hence, it becomes clear that there becomes almost not to be decreased the property of the detection by making use of such the one of the Hall elements as the 41. Further, the description regarding such the function as described above is caused due to the backlash by between the rotor and the stator regarding the central axis line of the rotation of such the rotor in the rotation angle detector 1. And then as far as occurring such the backlash at therebetween, there becomes to be obtained a function as similar to the function as mentioned above for between the magnet 10 in the rotation angle detector 1 and the other one of the Hall elements as the 42 therein. Hence, there becomes to be designed the property of the detection by making use of such the other one of the Hall elements as the 42, that is not to be influenced at all due to such the backlash by between the rotor therein and the stator therein as described above.

Next, a modified example of the rotation angle detector according to the embodiment as described above will be described in detail below, with reference to the drawings. Moreover, according to such the description, there will be described in detail below regarding a case where there is designed to be attached such the rotation angle detector according to such the modified example onto a steering shaft (referred to as a shaft as an Sh hereinafter), that is a measurable rotation body regarding a steering device in a motor vehicle, and then there is designed to be detected a rotation angle of a steering wheel therein by making use thereof.

Figure 5:
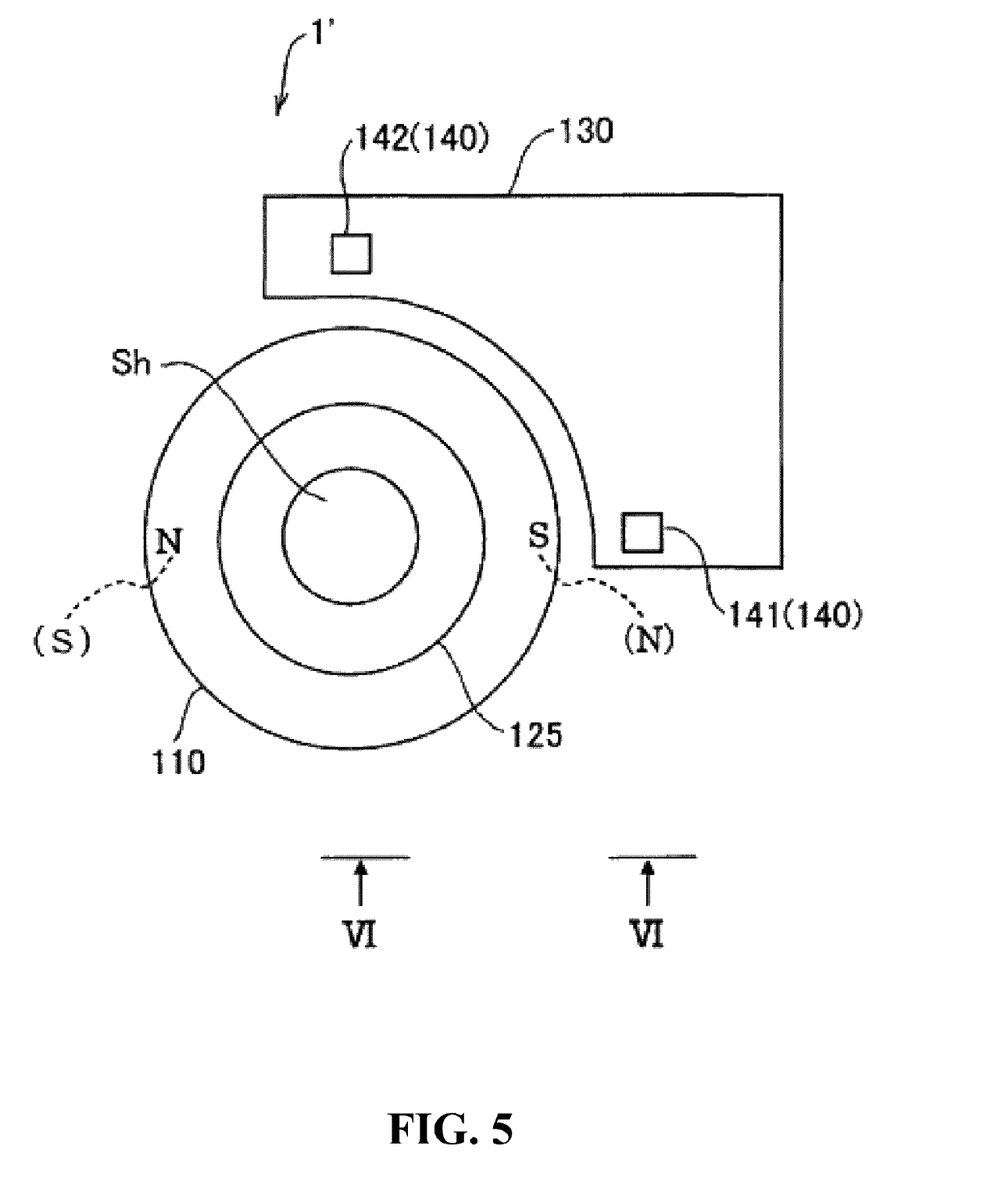
FIG. 5 is a schematic plan view showing a modified example according to the rotation angle detector as shown in FIG. 1.
Figure 6:
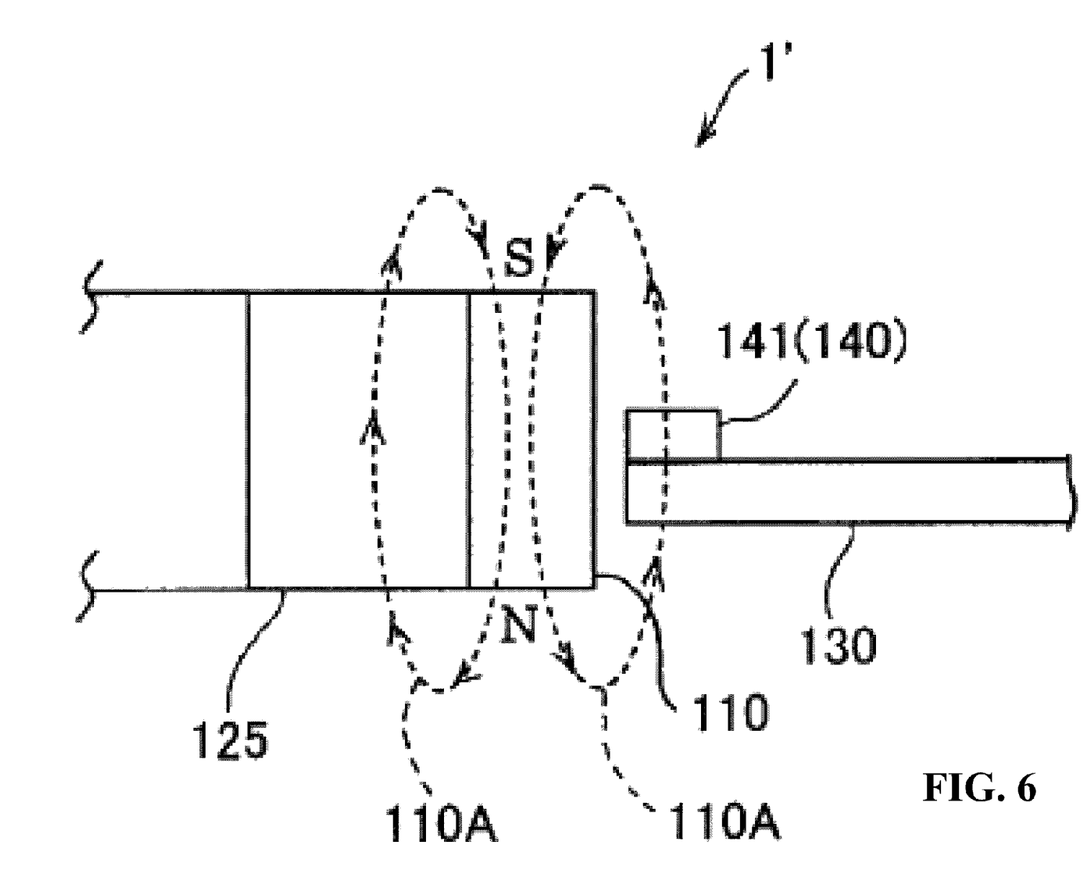
FIG. 6 is a schematic side view partially showing the rotation angle detector as shown in FIG. 5 from a view point of VI-VI side.

Here, such a rotation angle detector 1' regarding the modified example according to the present invention comprises as shown in FIG. 5 and in FIG. 6: a magnet 110 as a ring shape; a spacer 125 that is designed to be attached at an internal circumference of the magnet 110; a substrate 130 that is designed to be arranged and then to be fixed as independent of individual rotations of the magnet 110 and of the shaft as the Sh; and Hall elements 140 as two units (141 and 142) (magnetic detecting elements), that are designed to be arranged on such the substrate, with having approximately ninety degrees for therebetween to a central axis line of the magnet 110, and with spacing a distance as equivalent to each other from such the central axis line of the magnet 110, at an outer side in a circumferential direction of such the magnet 110. Moreover, there is designed to be fixed such the substrate 130 onto a stator that is comprised of such as a packaging body or the like that is not shown in the figures.

Further, there are designed the magnet 110 and the spacer 125 to comprise a portion of a rotor or a whole thereof as not described in detail here. Still further, there is designed such the rotor to be supported as rotatable by such the stator via a member for support that is not shown in the figures. Still further, there is designed to be allowed a backlash as a certain degree of magnitude in a direction of a central axis line of the rotation of the rotor for between the stator in the rotation angle detector 1' and the rotor therein, for improving an assembly easiness of such the rotation angle detector.

Still further, there is designed the spacer 125 as the ring shape, that is designed to be attached at the inner side of the magnet 110, to be comprised of a spacer that is made from a non-magnetic substance. Still further, there is designed to be formed such as a serration or the like at a face on the internal circumference of such the spacer 125 as the ring shape, that is not shown in the figures, and then there is designed the same to be engaged with a serration of the shaft as the Sh that is not shown in the figures. And then via the spacer 125, there is designed such the magnet 110 to be rotated together with the rotation of such the shaft as the Sh as integral therewith. Still further, there is designed such the magnet 110 to be supported as rotatable, by the substrate 130, or by a packaging body that is designed to house such the substrate 130, with making use of such as a shaft bush or the like that does not influence onto a magnetic circuit thereof.

Still further, regarding a configuration of such the magnet 110, there is designed to be formed at one point part in a circumferential direction thereof (a right side in FIG. 5) as one side in the direction of the central axis line of the magnet 110 (an upper side in FIG. 6) is defined to be as a south pole and as the other side in the direction of the axis line of the magnet 110 (a lower side in FIG. 6) is defined to be as a north pole, as similar to that according to the magnet 10 as the ring shape as described above. Still further, there is designed the same to be formed at the other point part in the circumferential direction thereof (the point part at the opposite side to the one point part in a direction of a diameter thereof that is shown as a left side in FIG. 5) as one side therein is defined to be as a north pole and as the other side therein is defined to be as a south pole. And then between such the one point part thereof and the other point part thereof, there is designed each of formation regions of the north pole therein and of the south pole therein to be taken over the places to each other gradually toward a direction of a thickness of the magnet 110 (in the direction of the central axis line of the rotation of the magnet 110). Still further, regarding a position to be attached each of the Hall elements 140 for such the magnet 110, there is designed to be arranged at a position within a region that a line of magnetic force 110A due to the magnet 110 is formed and at a position that according to such the line of magnetic force 110A becomes to be approximately parallel to the axis line of the rotation of the magnet 110, as it is obvious from a state of an arrangement regarding one of the Hall elements as the 141 that is shown in FIG. 6.

Furthermore, regarding a process for detecting the rotation angle by making use of each of such the Hall elements 140, the further detailed description will be omitted hereinafter, as that is similar to that by making use of the rotation angle detector 1 according to the embodiment as described above.

Next, a function of such the rotation angle detector 1' as described above will be described in detail below, with reference to the drawings. Here, FIG. 6 is a view for exemplary showing the line of magnetic force 110A according to the magnet 110 in a case where such the rotation angle detector 1' is attached onto the shaft as the Sh that is not shown in the figure, with maintaining a state as optimal to each of therebetween. And then according to such FIG. 6, there is designed the one of the Hall elements as the 141 to be arranged at a position on the line of magnetic force 110A according to the magnet 110 as the ring shape, that becomes to be parallel to the central axis line of the rotation of such the magnet 110, and that is optimal from an attaching point of view. Moreover, there is designed to be detected the degree of magnitude of the magnetic flux density according thereto by making use of such the one of the Hall elements as the 141.

Figure 7:
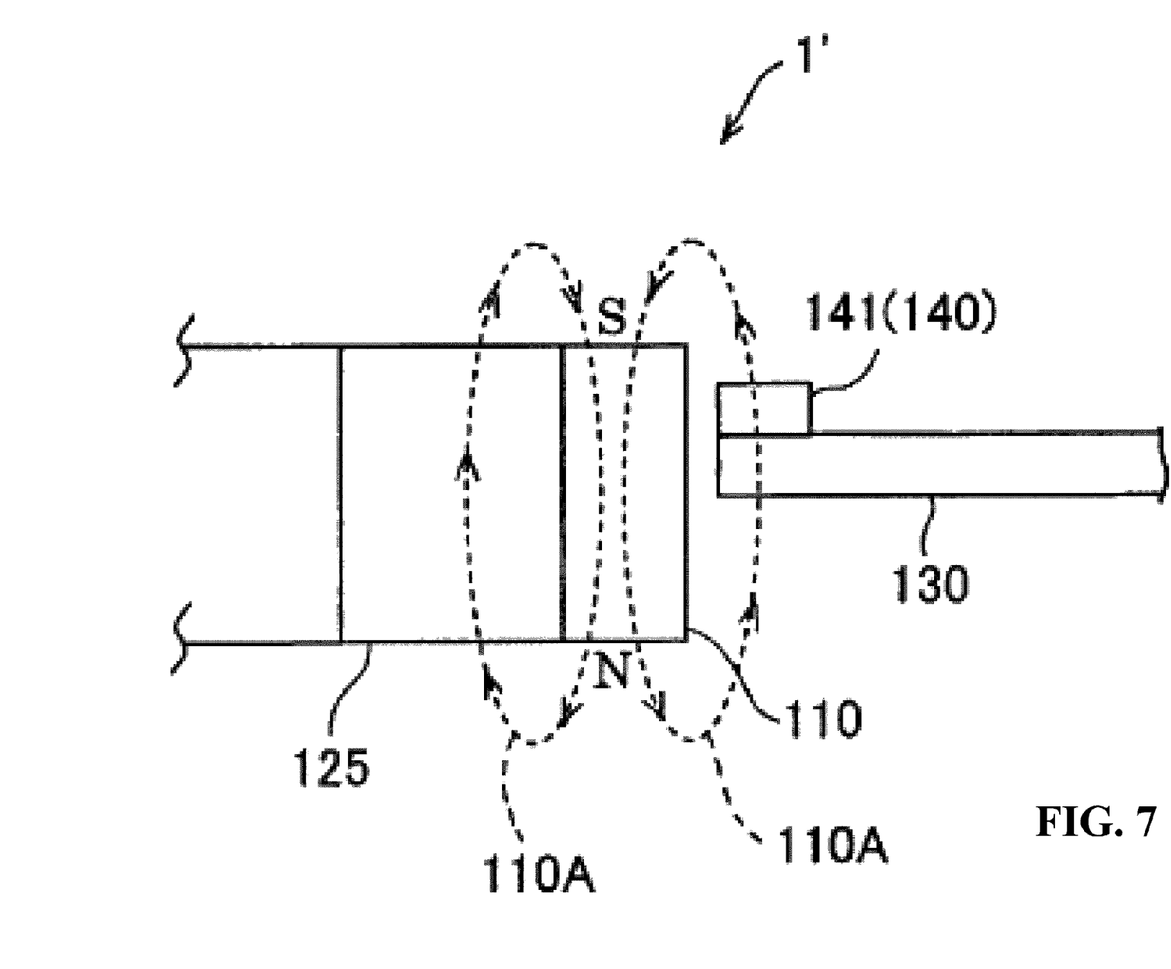
FIG. 7 is a schematic side view showing a state that a substrate (stator), onto which a Hall element is mounted in a rotation angle detector, is shifted comparing to a magnet (rotor) as a little amount toward a direction of a central axis line of the rotation in the rotor.

On the contrary thereto, FIG. 7 shows a state that in a case where a backlash as a certain degree of magnitude thereof is allowed, for improving the assembly easiness for such the rotation angle detector 1' as mentioned above, for between the stator in the rotation angle detector 1' and the rotor therein regarding the direction of the central axis line of the rotation of such the rotor, and then that the magnet 110 in such the rotation angle detector 1' as shown in FIG. 5 is shifted due to such the backlash as a little amount toward the direction of the central axis line of the rotation of such the magnet 110 comparing to the one of the Hall elements as the 141 therein. Moreover, such the degree of magnitude to be shifted is the degree of magnitude to be shifted that is required for designing an improvement of the assembly easiness for such the rotation angle detector 1'. And then even there becomes to be at such the state thereof, regarding the line of magnetic force 110A according to the magnet 110 crossing the one of the Hall elements as the 141 how to cross therethrough, it is approximately equivalent to the case where the relative arrangements for between the magnet 110 and the one of the Hall elements as the 141 are at the state as the optimum to each of therebetween. Hence, it becomes clear that there becomes almost not to be decreased the property of the detection by making use of such the Hall element as the 141.

Further, there becomes to be functioned such the function as described above in the case where there becomes to be occurred the backlash by between the rotor therein and the stator therein regarding the central axis line of the rotation of such the rotor in the rotation angle detector 1'. And then there becomes to be obtained a function as similar to the function as mentioned above for between the magnet 110 in the rotation angle detector 1' and the other one of the Hall elements as the 142 therein. Hence, there becomes to be designed the property of the detection by making use of such the other one of the Hall elements as the 142, that is not to be influenced at all by such the backlash by between the rotor therein and the stator therein as described above.

Thus, as described above, according to the rotation angle detector regarding the present invention, by comprising such the configuration as described above, it becomes able to design such the detector to be smaller in size with becoming superior in the assembly easiness therefor, and it becomes able to maintain the accuracy of the detection for the rotation angle thereof as stable at all the times thereof, without being influenced at all by any backlash, that may be allowed in the direction of the axis line of the rotor therein at between such the rotor and the stator therein for improving the assembly easiness therefor.

Moreover, it may be able to consider that there may be designed to make use of a magnetic resonance (an MR) element as a magnetic detecting element therefor regarding each of the rotation angle detectors according to the embodiment and each of the modified examples thereof as described above, in place of making use of any one of such the Hall elements as mentioned above. However, by making use of such the MR element, it is not able to judge thereby a polarity thereof at all, though it is able to judge thereby the degree of magnitude of the magnetic flux thereof. Thus, with making use of the Hall element that it is able to judge both of the degree of magnitude of the magnetic flux thereof and the polarity thereof, it is able to mention that has a utility value as higher, from a point of view that there becomes to be wider a range of the angle to be detectable thereby per one unit of the elements for each thereof (there becomes to be two times as theoretically therefor). Therefore, it is able to mention that there is technically significant to make use of any of such the Hall elements for each of the rotation angle detectors according to the embodiment and each of the modified examples thereof as described above.

Still further, the rotation angle detector according to the present invention is suitable in particular to a detection of a rotation angle of a steering device for a motor vehicle, that is required an accuracy of a detection for the rotation angle thereof as higher, and also that it cannot help but be allowed a certain degree of a component tolerance or of a backlash at an assembled state thereof, that is for improving an assembly easiness thereof as well. Furthermore, such the rotation angle detector according to the present invention is applicable to any devices as well, if it is required to evaluate such as a relative rotation angle for between axes of rotation therein, a rotating torque thereof, or the like, that rotates with vibrating, for such as a robot arm or the like.

What is claimed is:

1. A rotation angle detector, for detecting a rotation angle of a measurable rotation body having a central axis of rotation, comprising:
   a magnet that is designed to be attached onto the measurable rotation body and then to be rotated as integral with the measurable rotation body, a magnetic pole of the magnet at a portion of a circumference thereof being different on one side of the magnet than on another side of the magnet, the one side and the other side opposing each other in the direction of the central axis of rotation;
   a magnetic detecting element, for detecting a magnetic flux density of the magnet, wherein
   the magnetic detecting element is arranged outside the circumference of the magnet in a radial direction of the magnet at an approximately intermediate position with respect to the thickness of the magnet in the direction of the central axis of rotation,
   the magnetic detecting element is thinner than the magnet in the direction of the central axis of rotation, and
   the magnet is movable in the direction of the central axis of rotation such that a plane containing a surface of the magnet on the one side is movable from one side of a surface of the magnet detecting element to the other side of the surface of the magnet detecting element in the direction of the central axis of rotation.

2. The rotation angle detector as defined in claim 1, wherein
   the magnetic detecting element is for detecting a degree of magnitude regarding the magnetic flux density which is in parallel to the line of magnetic force parallel to the thickness direction of the magnet.

3. The rotation angle detector as defined in claim 1, further comprising
   a substrate on which the magnet detecting element is arranged, wherein
   the magnet is movable in the direction of the central axis of rotation such that a plane containing a surface of the magnet on the other side is movable from one side of a surface of the substrate to the other side of the surface of the substrate in the direction of the central axis of rotation.

* * * * *